UNITED STATES PATENT OFFICE.

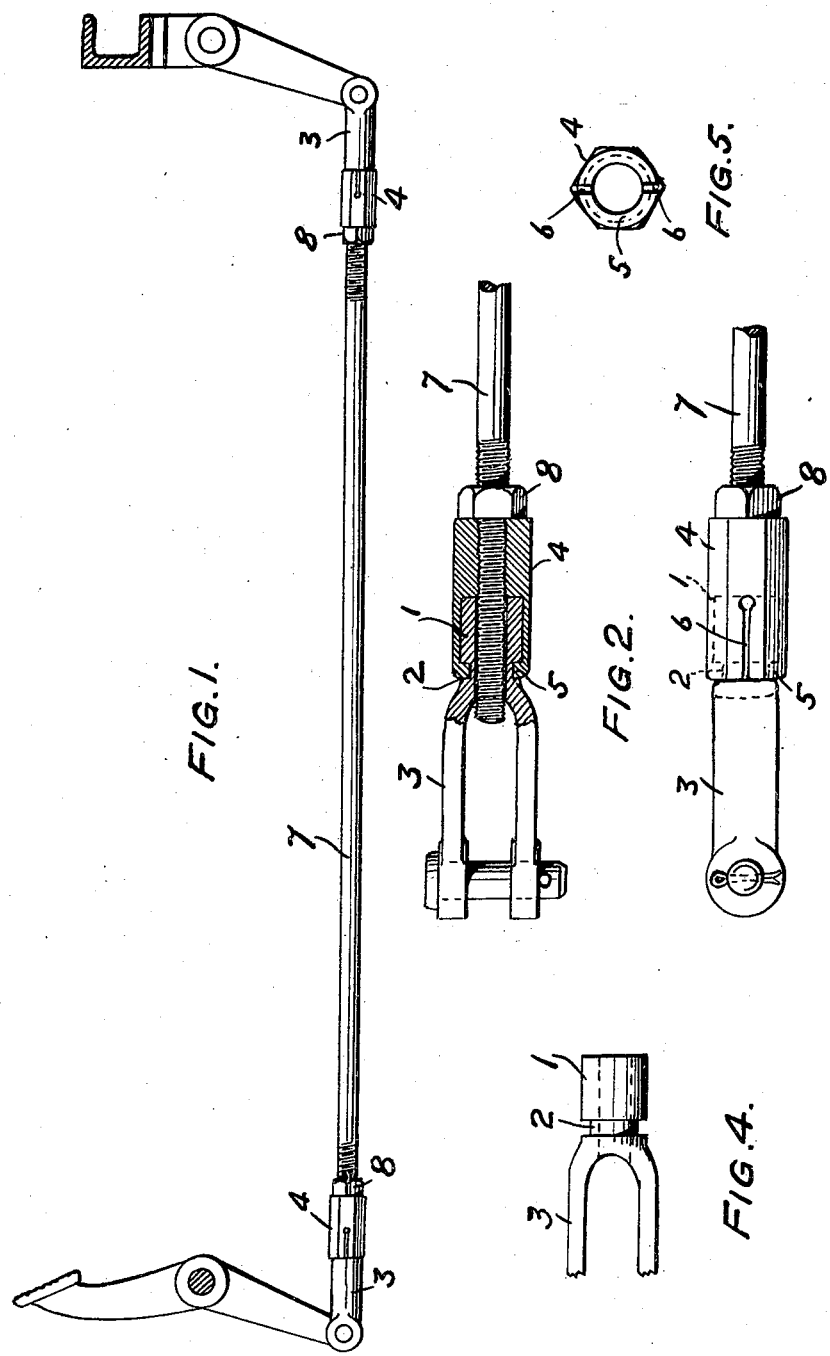

THOMAS J. GORMAN, OF PHILADELPHIA, PENNSYLVANIA.

LONGITUDINAL ROD ADJUSTMENT.

1,418,298. Specification of Letters Patent. Patented June 6, 1922.

Application filed December 29, 1919. Serial No. 348,014.

*To all whom it may concern:*

Be it known that I, THOMAS J. GORMAN, a citizen of the United States, residing at Philadelphia, in the county of Philadelphia and State of Pennsylvania, have invented a new and useful Longitudinal Rod Adjustment, of which the following is a specification.

In many instances, for example, in the case of the brake-gear of automobiles, it is necessary to adjust the length of rods connecting other parts or elements by means of yokes or shackles and transmitting motion between them.

The principal object of the present invention is to provide a durable, simple, reliable and comparatively inexpensive longitudinal adjustment for rods by which their length can be accurately changed without detaching their yokes or shackles from the parts which they connect and by a simple adjustment of rotation.

Other objects of the invention will appear from the following description of the invention which latter will be claimed at the end hereof, but first described in connection with the accompanying drawings forming part hereof and in which—

Figure 1, is a side view, partly in section, of longitudinal adjustments applied to a rod, connecting elements or parts of an automobile brake gear.

Figs. 2 and 3, are respectively a sectional and a side view, drawn to an enlarged scale, and illustrating a longitudinal rod adjustment of the invention.

Fig. 4, is a top or plan view of one part of the adjustment, and

Fig. 5, is an end view of another part of the adjustment.

In the drawings 1, is an externally cylindrical tubular head provided with a contracted neck or groove 2, and forming part of or connected with a fork, yoke or shackle 3. 4, is a nut externally polygonal or otherwise adapted to accommodate a wrench or spanner and it is internally cylindrical and of two diameters. The portion of larger internal diameter is mounted on the head 1, and provided at the end of the nut with an inwardly extending flange 5, engaging the neck 2. The portion of the nut 4, of less internal diameter may be called an extension and is internally threaded or tapped and this tapped or threaded extension is of less diameter than the internal chamber of the tubular head 1. The portion of the nut 4, of larger internal diameter is longitudinally split as at 6, so that jaws, formed by the splits 6, can be bent apart and then pressed together in order to get the nut onto the head 1, with its internal flange 5, in the neck or groove 2.

The rod 7, is threaded and the threaded portion is of such diameter that it may pass freely through the bore or opening in the head 1, and engage the internally threaded portion of the nut 4; it being remembered that the diameter of the bore of the head 1, is larger than the diameter of the threaded opening in the nut 4.

In use the nut 4, may be turned one way or the other to shorten or lengthen the rod connection longitudinally and this can be done with the greatest accuracy and without unfastening any of the forks, shackles, or other connections 3. The jam-nuts 8, serve to prevent accidental shifting of the adjustment and they are of course backed off when an adjustment is made.

The fork 3 in combination with the tubular shackle and nut insures exposure of the end of the rod 7, and this is important in the case of the brake gear of automobiles for two reasons, first, it clearly exposes the end of the rod and so prevents the rod from being run into the shackle pin which would interrupt the adjustment, and second, it permits the end of the rod to be cut off without disturbing the parts so that further adjustment can be made.

I claim:

A longitudinal rod adjustment tubular for the passage of the rod and having an open fork for affording access to and exposing the end of the rod and comprising a shackle and a nut in turnable relation, there being a groove and flange connection provided between the shackle and the nut, the groove being in the exterior surface of the shackle and the flange being inturned on the nut.

THOMAS J. GORMAN.